United States Patent
Nakano

(10) Patent No.: US 12,333,772 B2
(45) Date of Patent: Jun. 17, 2025

(54) KEY POINT CORRECTION SYSTEM, KEY POINT CORRECTION METHOD, AND NONTRANSITORY COMPUTER READABLE MEDIUM

(71) Applicant: TOYOTA JIDOSHA KABUSHIKI KAISHA, Toyota (JP)

(72) Inventor: Yusuke Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

(21) Appl. No.: 17/982,696

(22) Filed: Nov. 8, 2022

(65) Prior Publication Data

US 2023/0154133 A1    May 18, 2023

(30) Foreign Application Priority Data

Nov. 12, 2021  (JP) ................. 2021-185000

(51) Int. Cl.
| | | |
|---|---|---|
| G06V 10/24 | (2022.01) | |
| G06T 7/246 | (2017.01) | |
| G06T 7/60 | (2017.01) | |
| G06T 7/73 | (2017.01) | |

(52) U.S. Cl.
CPC ............ *G06V 10/245* (2022.01); *G06T 7/246* (2017.01); *G06T 7/60* (2013.01); *G06T 7/73* (2017.01); *G06T 2207/20081* (2013.01); *G06V 2201/07* (2022.01)

(58) Field of Classification Search
CPC ............ G06V 10/245; G06V 2201/07; G06V 10/247; G06V 10/462; G06V 10/757; G06T 7/246; G06T 7/60; G06T 7/73; G06T 2207/20081; G06T 7/62; G06T 2207/10016; G06T 2207/30236

See application file for complete search history.

(56) References Cited

U.S. PATENT DOCUMENTS

| | | | |
|---|---|---|---|
| 2010/0322475 A1* | 12/2010 | Ikeda | G06T 7/254 382/103 |
| 2018/0188027 A1* | 7/2018 | Zhang | G06V 20/588 |
| 2022/0405961 A1* | 12/2022 | Nayar | G06F 18/214 |

FOREIGN PATENT DOCUMENTS

| | | |
|---|---|---|
| JP | 2006-323437 A | 11/2006 |
| JP | 2010-039617 A | 2/2010 |

OTHER PUBLICATIONS

Machine translation for JP 2006-323437, IDS (Year: 2006).*
Machine translation for 2010-039617 (Year: 2010).*

\* cited by examiner

*Primary Examiner* — Qian Yang
(74) *Attorney, Agent, or Firm* — Dinsmore & Shohl LLP

(57) ABSTRACT

A key point correction apparatus detects a plurality of key points of a target object from each of a plurality of captured images. The key point correction apparatus decides whether or not a plurality of key points of the target object detected from the captured image satisfy an appropriacy condition. When the key points of the target object satisfy the appropriacy condition, the key point correction apparatus determines a correction parameter regarding the target object using the key points. When a correction parameter has been determined for the target object detected from the captured image, the key point correction apparatus corrects the key points of the target object using a correction parameter.

8 Claims, 10 Drawing Sheets

ORTHORECTIFICATION

US 12,333,772 B2

KEY POINT CORRECTION SYSTEM, KEY POINT CORRECTION METHOD, AND NONTRANSITORY COMPUTER READABLE MEDIUM

CROSS REFERENCE TO RELATED APPLICATIONS

This application is based upon and claims the benefit of priority from Japanese patent application No. 2021-185000, filed on Nov. 12, 2021, the disclosure of which is incorporated herein in its entirety by reference.

BACKGROUND

The present disclosure relates to a technique for detecting key points of a moving object included in a captured image.

Techniques for detecting key points of a moving object such as a vehicle or a person in an image by analyzing a captured image obtained by photographing the moving object have been developed. For example, Japanese Unexamined Patent Application Publication No. 2010-039617 discloses a technique for detecting key points of a moving object from a plurality of captured images generated at timings different from each other and stably tracking the moving object that is partially deformed using the detected key points.

SUMMARY

Japanese Unexamined Patent Application Publication No. 2010-039617 does not mention about an accuracy of key points. The present disclosure provides a technique for improving the accuracy of key points of a moving object detected from a captured image.

A key point correction system according to the present disclosure includes: at least one memory storing instructions; and at least one processor. The at least one processor is configured to execute the instructions to: acquire a plurality of captured images; detect a plurality of key points of a moving object from each of the captured images; decide whether or not the plurality of key points of the moving object detected from the captured images satisfy a predetermined appropriacy condition; determine, when the plurality of key points of the moving object satisfy the appropriacy condition, a correction parameter to be used to correct the plurality of key points detected for the moving object using the plurality of key points; and correct, when the correction parameter has been determined for the moving object regarding which the plurality of key points are detected from the captured image, the plurality of key points by using the correction parameter.

A key point correction method according to the present disclosure is executed by a computer. This control method includes: acquiring a plurality of captured images; detecting a plurality of key points of a moving object from each of the captured images; deciding whether or not the plurality of key points of the moving object detected from the captured images satisfy a predetermined appropriacy condition; determining, when the plurality of key points of the moving object satisfy the appropriacy condition, a correction parameter to be used to correct the plurality of key points detected for the moving object using the plurality of key points; and correcting, when the correction parameter has been determined for the moving object regarding which the plurality of key points are detected from the captured image, the plurality of key points by using the correction parameter.

A non-transitory computer readable medium according to the present disclosure stores a program for causing a computer to execute a key point correction method according to the present disclosure.

According to the present disclosure, a technique for improving the accuracy of key points of a moving object detected from a captured image is provided.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

In the following description, with reference to the drawings, embodiments of the present disclosure will be described in detail. Throughout the drawings, the same or corresponding elements are denoted by the same symbols and redundant descriptions will be omitted as necessary for the sake of clarification of the description. Further, unless otherwise explained, values that are defined in advance such as predetermined values or thresholds are stored in advance in a storage unit or the like that is accessible from an apparatus that uses the values. Further, unless otherwise explained, the storage unit is implemented with one or more storage devices of any number.

First Embodiment

Overview

Figure 1:
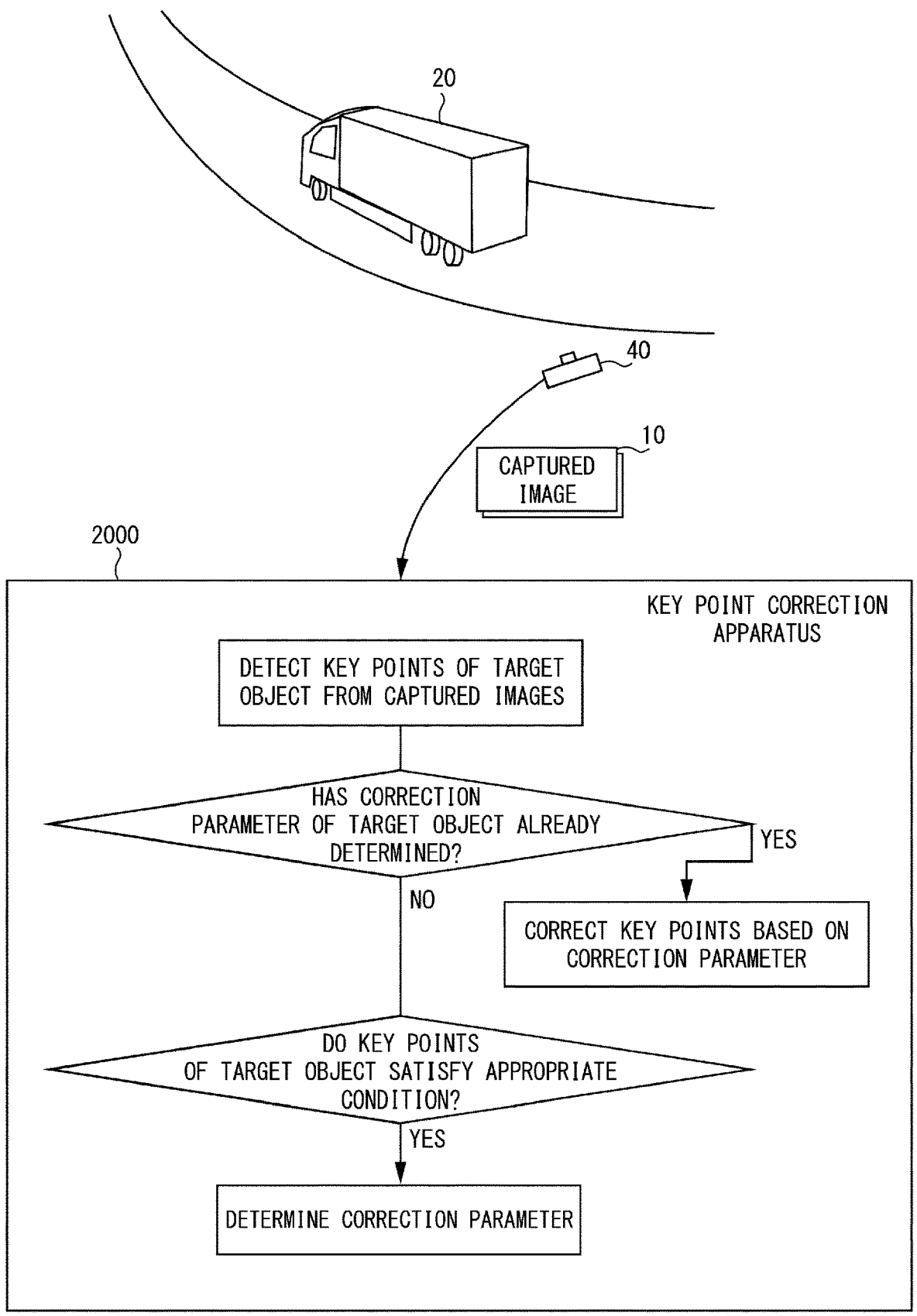
FIG. 1 is a diagram illustrating an overview of operations of a key point correction apparatus according to a first embodiment.

FIG. 1 is a diagram illustrating an overview of operations of a key point correction apparatus (system) 2000 according to a first embodiment. FIG. 1 is a diagram for facilitating understanding of the overview of the key point correction apparatus 2000, and the operations of the key point correction apparatus 2000 are not limited to those shown in FIG. 1.

The key point correction apparatus 2000 detects key points of a target object 20 from a time series of a plurality of captured images 10 (e.g., a plurality of video frames that form video data). The target object 20 is a moving object of a predetermined kind that is handled as a target of key point detection. The predetermined kind of moving object may include, for example, a vehicle, a person, or a mobile robot. The vehicle may be any one of various kinds of vehicles, such as any automobile (e.g., a bus, a truck, or a passenger car), a motorcycle, or a bicycle. Note that the type of the moving object that the key point correction apparatus 2000 handles as the target object 20 is not limited to one type of moving object and each of a plurality of kinds of moving objects may be handled as the target object 20. The key point correction apparatus 2000 detects, for example, any kinds of vehicle and persons as target objects 20.

The captured images 10 are generated by a camera 40 installed so as to be able to photograph the target object 20. For example, when a vehicle or a person is handled as the target object 20, the camera 40 is installed in a place from which it can photograph the road. The camera 40 may be a video camera that generates video data or may be a still camera that generates still image data. In the latter case, the camera 40 generates a time series of a plurality of captured images 10 by repeatedly photographing the target object 20.

The key points of the target object 20 are feature points of the target object 20 detected from the captured images 10, and can be used to represent the position or the posture of the target object 20. The key points are, for example, points that are obtained by projecting, onto the road, vertices of a bottom surface of a three-dimensional bounding box that surrounds the target object 20.

Figure 2:
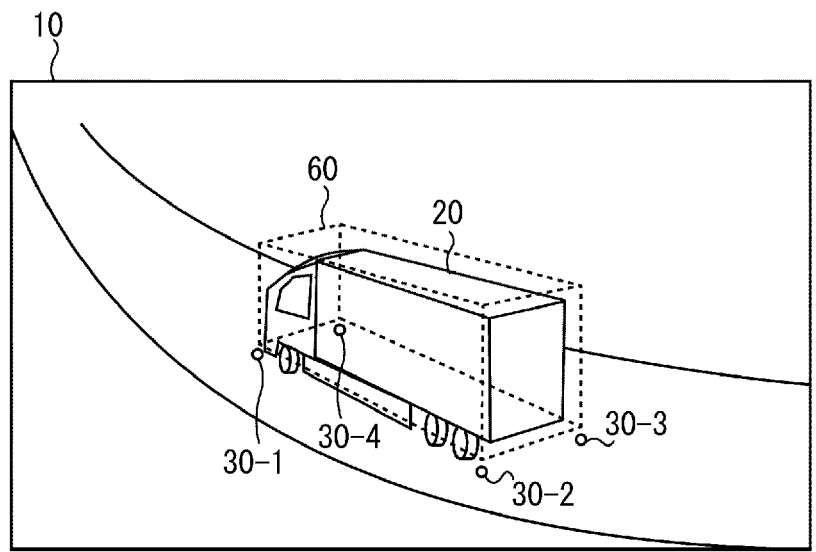
FIG. 2 is a diagram illustrating key points of a target object.
Figure 2:
Figure 2:
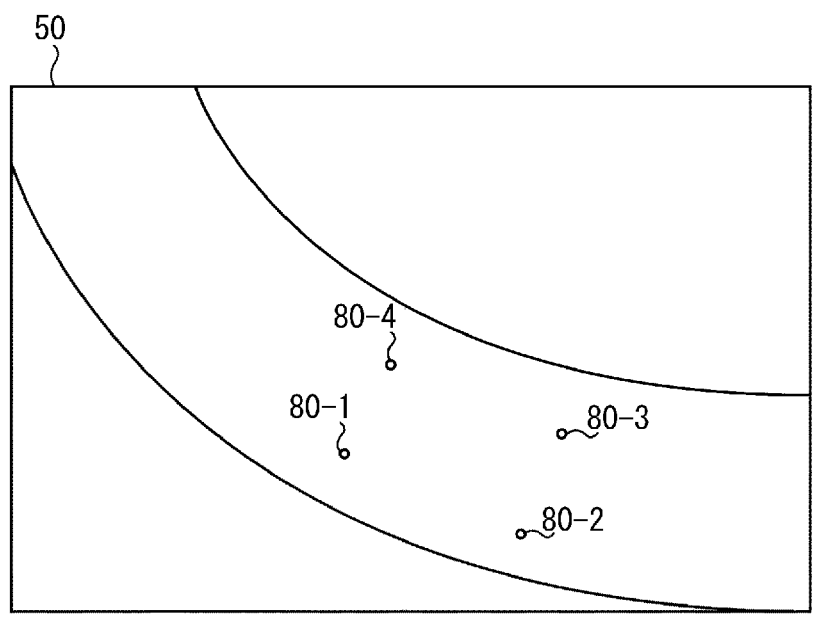

FIG. 2 is a diagram illustrating the key points of the target object 20. FIG. 2 shows a captured image 10 and an orthoimage 50 obtained by performing orthorectification on the captured image 10. The orthorectification for obtaining the orthoimage 50 from the captured image 10 can be achieved by using a predetermined homography matrix.

A bounding box 60 is a three-dimensional bounding box that surrounds a target object 20 detected from the captured image 10. Key points 30-1, 30-2, 30-3, and 30-4, which are key points of the target object 20, can be obtained by projecting the respective vertices of the bottom surface of the bounding box 60 onto the road.

Key point correspondence points 80 represent the key points 30 projected onto the orthoimage 50 by orthorectification. A key point correspondence point 80-1, a key point correspondence point 80-2, a key point correspondence point 80-3, and a key point correspondence point 80-4 respectively correspond to the key point 30-1, the key point 30-2, the key point 30-3, and the key point 30-4.

The key points 30 are not limited to the points obtained by projecting the vertices of the bottom surface of the three-dimensional bounding box of the target object 20 onto the road. For example, the respective vertices of the three-dimensional bounding box of the target object 20 may be handled as the key points 30.

The key point correction apparatus 2000 detects the key points 30 of the target object 20 included in each of the captured images 10. If a plurality of target objects 20 are detected from one captured image 10, the key points 30 are detected for each of these plurality of target objects 20.

The key point correction apparatus 2000 further decides, for each captured image 10, whether or not there exists a target object 20, among the target objects 20 detected from the captured image 10, whose key points 30 satisfy a predetermined appropriacy condition. The appropriacy condition is a condition that is satisfied when it is highly likely that key points 30 of a target object 20 are detected with a high accuracy from a captured image 10 and when the key points 30 are suitable for deciding a correction parameter of the target object 20 that will be described later. The details of the appropriacy condition will be described later.

When the key points 30 of a target object 20 detected from a captured image 10 satisfy the appropriacy condition, this captured image 10 is referred to as an appropriate image that corresponds to the target object 20. In other words, the appropriate image that corresponds to a target object 20 is a captured image 10 whose key points 30 detected from the target object 20 satisfy the appropriacy condition.

When it is decided that the key points 30 of the target object 20 detected from the captured image 10 satisfy the appropriacy condition, the key point correction apparatus 2000 determines, for the target object 20 that corresponds to this captured image 10 (appropriate image), a correction parameter that is used to correct the key points 30. The correction parameter represents a relative positional relation that a plurality of key points 30 detected for the corresponding target object 20 should satisfy. For example, the key point correction apparatus 2000 uses the key point correspondence points 80 on the orthoimage 50 obtained from the appropriate image to determine a rectangular area on the orthoimage 50 that represents the target object 20 corresponding to this appropriate image. Then, the key point correction apparatus 2000 determines a combination of the width and the height of this rectangular area as a correction parameter that corresponds to the target object 20. The relative positional relation that the key point correspondence points 80 of the target object 20 should satisfy is defined by this correction parameter. Here, the key point correspondence points 80 are points that correspond to the key points 30. Thus, as a result of the relative positional relation that the key point correspondence points 80 of the target object 20 should satisfy being defined, a relative positional relation that the key points 30 of the target object 20 should satisfy is defined as well.

When the correction parameter is determined for the target object 20 detected from the captured image 10, the key point correction apparatus 2000 corrects the key points 30 of the target object 20 detected from the captured image 10 using the correction parameter determined for this target object 20. In other words, when a target object 20 is detected from a captured image 10 that is generated later than an appropriate image of this target object 20, the key point correction apparatus 2000 corrects the key points 30 of the target object 20 detected from the captured image 10 using the correction parameter that has been determined for this target object 20.

Examples of Effects

The key point correction apparatus 2000 detects the key points 30 of the target object 20 from the captured image 10. The accuracy of the process of detecting the key points 30 from the captured image 10 may vary depending on how the target object 20 is seen in the captured image 10. For example, In a situation in which the position or the posture of the target object 20 is a position or a posture with which only one side surface of the target object 20 can be captured by the camera 40, the target object 20 can be captured by the camera 40 only in a plan view, whereby the accuracy of the process of detecting the key points 30 of the target object 20 may be low. On the other hand, when the position or the posture of the target object 20 is a position or a posture with which the upper surface and two side surfaces of the target object 20 can be captured by the camera 40, this target object 20 can be captured by the camera 40 in a three dimensional way, whereby the accuracy of the process of detecting the key points 30 of the target object 20 may be high.

In view of those situations in which there may be differences in the accuracy of the key points 30, the key point correction apparatus 2000 uses the key points 30 that are considered to have been detected with high accuracy to correct the other key points 30. The appropriacy condition is defined in advance in such a way that this condition is satisfied when the key points 30 are considered to have been detected with high accuracy. Then, when the key points 30 of the target object 20 detected from the captured image 10 satisfy the appropriacy condition, the key point correction apparatus 2000 determines the correction parameter of the target object 20 using the key points 30. According to this procedure, the correction parameter is defined based on the key points 30 that are considered to have been detected with high accuracy. Then, when a target object 20 whose correction parameter has been determined is detected from the captured image 10, the key point correction apparatus 2000 corrects the key points 30 of this target object 20 using the correction parameter. According to this procedure, based on the key points 30 considered to have been detected with high accuracy, the other key points 30 are corrected. Therefore, by using the key point correction apparatus 2000, the accuracy of the key points 30 may be improved.

In the following, the key point correction apparatus 2000 according to this example embodiment will be described in further detail.

<Example of Functional Configuration>

Figure 3:
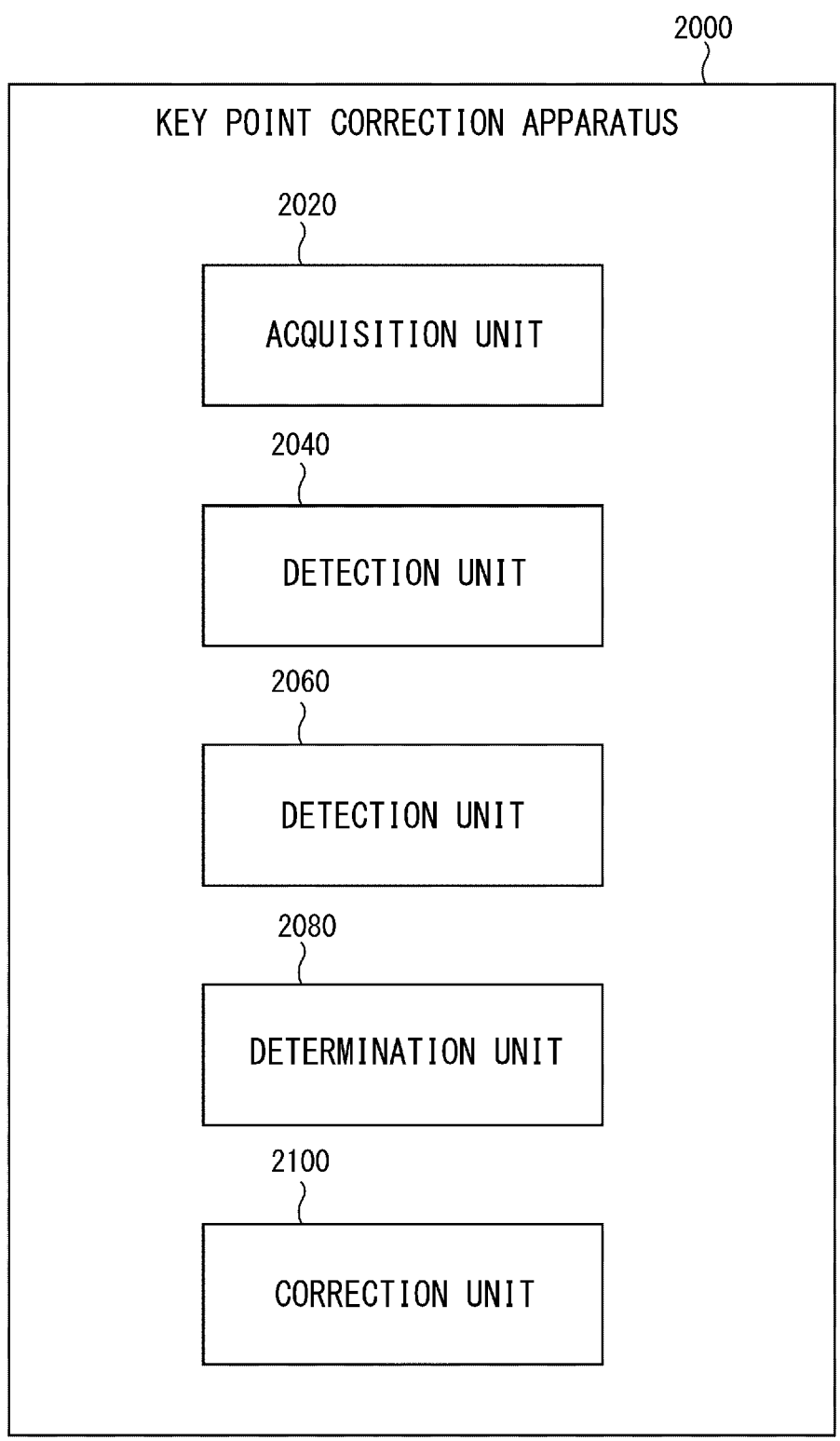
FIG. 3 is a block diagram illustrating a functional configuration of the key point correction apparatus according to the first embodiment.

FIG. 3 is a block diagram illustrating a functional configuration of the key point correction apparatus 2000 according to the first embodiment. An acquisition unit 2020 acquires a plurality of captured images 10. A detection unit 2040 detects key points 30 of a target object 20 included in each of the captured images 10. A decision unit 2060 decides whether or not the key points 30 of the target object 20 detected from the captured images 10 satisfy an appropriacy condition regarding whether to use these key points 30 to decide a correction parameter. When the key points 30 of the target object 20 detected from the captured images 10 satisfy the appropriacy condition, a determination unit 2080 determines the correction parameter regarding the target object 20 using the key points 30. When the correction parameter that corresponds to the target object 20 detected from the captured images 10 has been determined, a correction unit 2100 corrects the key points 30 of the target object 20 detected from the captured images 10 using the correction parameter that corresponds to the target object 20.

<Example of Hardware Configuration>

Each functional configuration unit of the key point correction apparatus 2000 may be implemented with hardware (e.g., a hardwired electronic circuit) that implements each functional configuration unit or by a combination of hardware with software (e.g., a combination of an electronic circuit with a program that controls the electronic circuit). Hereinafter, a case in which each functional configuration unit of the key point correction apparatus 2000 is implemented with a combination of hardware with software will be further described.

Figure 4:
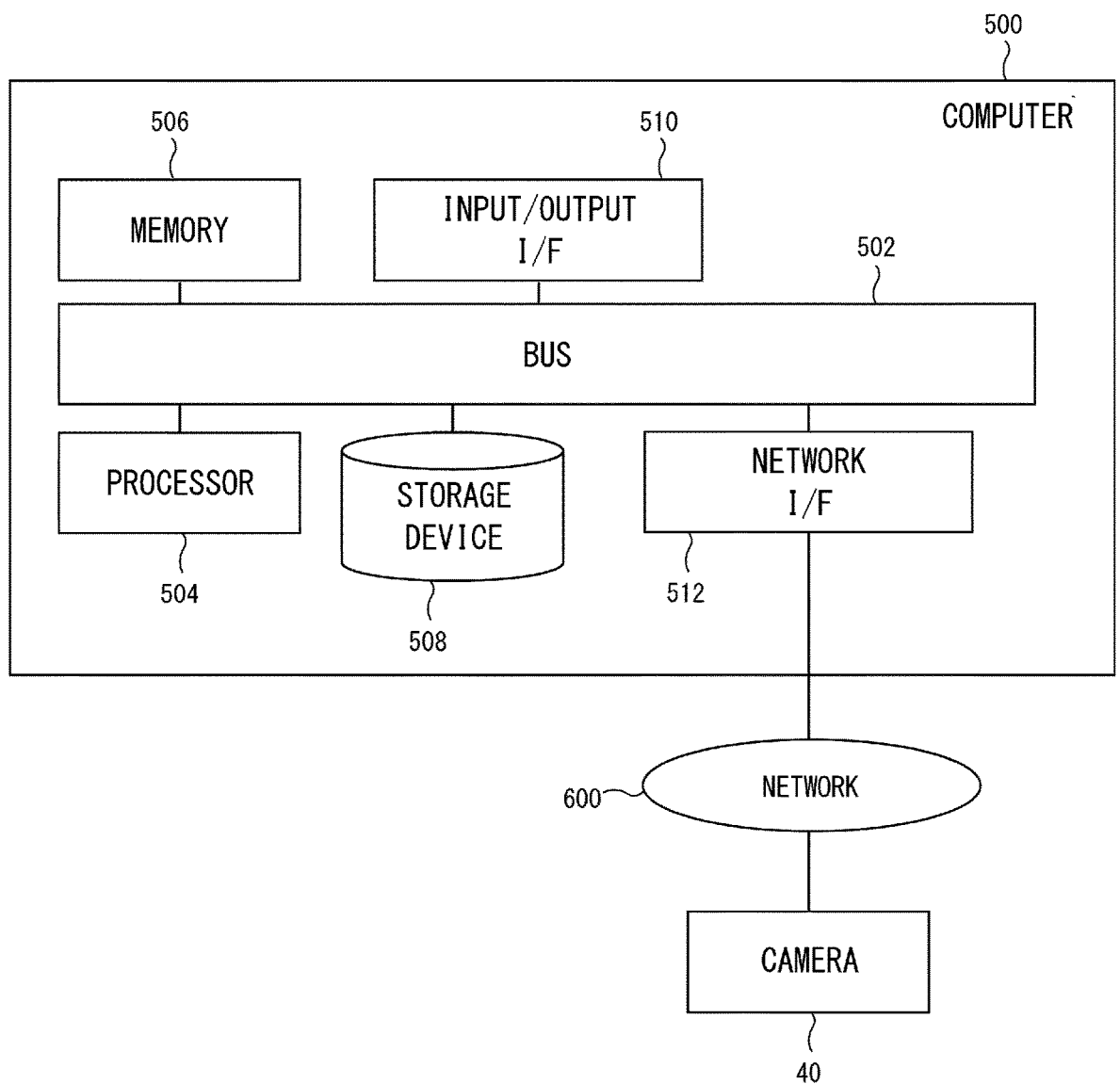
FIG. 4 is a block diagram illustrating a hardware configuration of a computer that implements the key point correction apparatus.

FIG. 4 is a block diagram illustrating a hardware configuration of a computer 500 that implements the key point correction apparatus 2000. The computer 500 may be any type of computer. The computer 500 is, for example, a stationary computer such as a Personal Computer (PC) or a server machine. The computer 500 may instead be a portable computer such as a smartphone or a tablet terminal. Note that the computer 500 may be provided inside the camera 40 that generates captured images 10. The computer 500 may be a special-purpose computer that is designed to implement the key point correction apparatus 2000 or may be a general-purpose computer.

By installing a predetermined application in the computer 500, for example, each function of the key point correction apparatus 2000 is implemented in the computer 500. The above application is formed of a program that implements each functional configuration unit of the key point correction apparatus 2000. The above program may be acquired in arbitrary ways. For example, the program may be acquired from a storage medium (such as a DVD disc or a USB memory) that stores this program. The program may also be acquired by downloading, for example, the program from a server apparatus that manages a storage medium storing the program.

The computer 500 includes a bus 502, a processor 504, a memory 506, a storage device 508, an input/output interface 510, and a network interface 512. The bus 502 is a data transmission path for enabling the processor 504, the memory 506, the storage device 508, the input/output interface 510, and the network interface 512 to transmit and receive data among them. However, the method for connecting the processor 504 and the like to one another is not limited to the bus connection.

The processor 504 may be any type of processor such as a Central Processing Unit (CPU), a Graphics Processing Unit (GPU), or a Field-Programmable Gate Array (FPGA). The memory 506 is a main memory unit that is implemented using a Random Access Memory (RAM) or the like. The storage device 508 is an auxiliary storage device that is implemented by using a hard disk, a Solid State Drive (SSD), a memory card, or a Read Only Memory (ROM).

The input/output interface 510 is an interface for connecting the computer 500 with an input/output device. An input device such as a keyboard and an output device such as a display device are connected, for example, to the input/output interface 510.

The network interface 512 is an interface for connecting the computer 500 to a network 600. The network 600 may be a Local Area Network (LAN) or a Wide Area Network (WAN). In FIG. 4, for example, the computer 500 is connected to the camera 40 via the network 600 in such a way that the computer 500 is able to communicate with the camera 40. However, the method for connecting the computer 500 to the camera 40 in such a way that they can communicate with each other is not limited to the connection via a network. Further, it is sufficient for the computer 500 to be capable of acquiring captured images 10 generated by the camera 40, and the computer 500 is not required to be connected with the camera 40 in a communicable manner.

The storage device 508 stores a program for implementing each functional configuration unit of the key point correction apparatus 2000 (a program for implementing the above-mentioned application). The processor 504 loads this program into the memory 506 to execute the loaded program, thereby implementing each functional configuration unit of the key point correction apparatus 2000.

The key point correction apparatus 2000 may be implemented with one computer 500 or may be implemented with a plurality of computers 500. In the latter case, the configuration of the computers 500 are not required to be the same as each other, and may be different from each other.

<Flow of Process>

Figure 5:
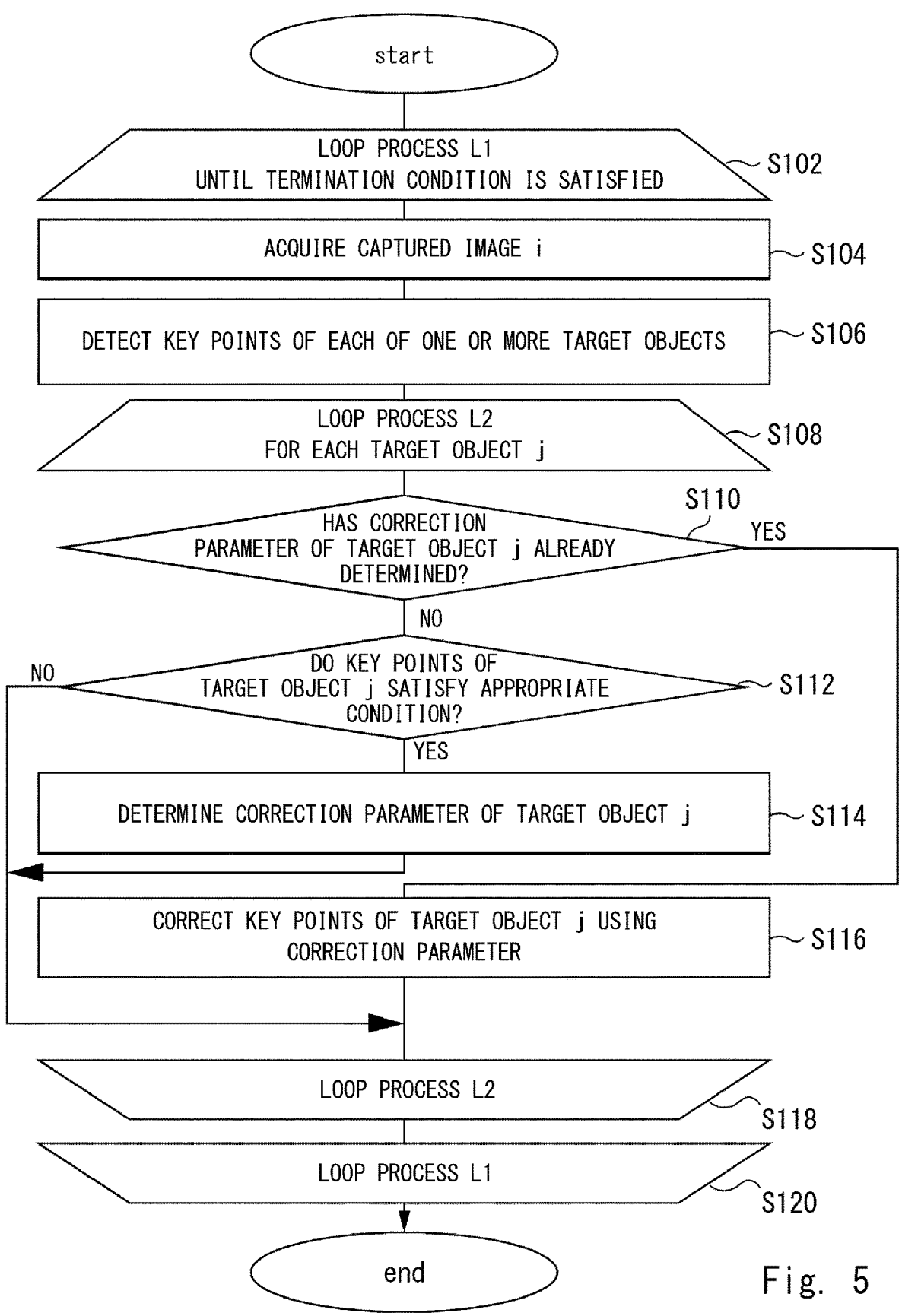
FIG. 5 is a flowchart illustrating a flow of process executed by the key point correction apparatus according to the first embodiment.

FIG. 5 is a flowchart illustrating a flow of process executed by the key point correction apparatus 2000 according to the first embodiment. The flow of process shown in FIG. 5 is a merely example and the flow of the process executed by the key point correction apparatus 2000 is not limited to the one shown in FIG. 5.

Steps S102 to S120 form a loop process L1. The loop process L1 is repeatedly executed until a predetermined termination condition is satisfied. The termination condition of the loop process L1 may be arbitrary one. The termination condition may be, for example, a condition that "there is no new captured image 10" or a condition that "a predetermined user operation is performed".

The acquisition unit 2020 acquires a captured image i (S104). It is noted that the acquisition unit 2020 acquires captured images 10 in an ascending order of the time at which the captured images 10 is generated. The detection unit 2040 detects key points 30 of each of one or more target objects 20 from the captured image i (S106).

Steps S108 to S118 form loop process L2. The loop process L2 is executed for each of the target objects 20 detected from the captured image i. In S108, the key point correction apparatus 2000 decides whether or not there are target objects 20, among those detected from the captured image i, that has not been handled as a target of the loop process L2 yet. When the loop process L2 has already been executed for all the target objects 20, the process of FIG. 5 proceeds to S120. On the other hand, when there are target objects 20 that has not been handled as a target of the loop process L2 yet, one of them is selected and the loop process L2 is executed for the selected target object 20. The target object 20 selected here is denoted by a target object j.

The decision unit 2060 decides, regarding the key points 30 of the target object j, whether or not a correction parameter has already been decided (S110). When the correction parameter of the target object j has not been determined yet (S110: NO), the decision unit 2060 decides whether or not the key points 30 of the target object j satisfy the appropriacy condition (S112). When the key points 30 of the target object j satisfy the appropriacy condition (S112: YES), the determination unit 2080 determines, based on the key points 30 of the target object j detected from the captured image i, a correction parameter of the key points 30 of the target object j (S114). When the key points 30 of the target object j do not satisfy the appropriacy condition (S112: NO), the process of FIG. 5 proceeds to S118.

When the correction parameter of the target object j has already been determined in S110 (S110: YES), the correction unit 2100 corrects the key points 30 of the target object j detected from the captured image i based on the correction parameter (S116).

Step S118 is the end of the loop process L2. Therefore, the process of FIG. 5 proceeds to the top of the loop process L2 (S108).

After the loop process L2 is executed for all the target objects 20 detected from the captured image i, the process of FIG. 5 proceeds to S120. Since S120 is the end of the loop process L1, the process of FIG. 5 proceeds to the top of the loop process L1 (S102).

The number of cameras 40 handled by the key point correction apparatus 2000 may be one or more. In the latter case, the key point correction apparatus 2000 performs, for each of the plurality of cameras 40, the process shown in FIG. 5 on a time series of a plurality of the captured images 10 generated by the camera 40.

<Acquisition of Captured Images 10: S104>

The acquisition unit 2020 acquires captured images 10 (S104). The captured images 10 may be acquired in arbitrary manner. For example, the captured images 10 are stored in the storage unit in advance in a manner where they are accessible from the key point correction apparatus 2000. In this case, the acquisition unit 2020 acquires the captured images 10 by accessing the storage unit. In another example, the acquisition unit 2020 may acquire the captured images 10 by receiving the captured images 10 transmitted from another apparatus (e.g., the camera 40).

The acquisition unit 2020 may acquire the captured images 10 one by one or may collectively acquire the plurality of captured images 10. In the latter case, for example, the acquisition unit 2020 periodically accesses a storage unit that stores the captured images 10 and then collectively acquires the captured images 10 that the acquisition unit 2020 has not acquired yet.

<Detection of Key Points 30: S106>

The detection unit 2040 detects key points 30 of the target object 20 from the captured images 10 (S106). In order to detect the key points 30, first, the detection unit 2040 detects the target object 20 from the captured images 10. Then, the detection unit 2040 detects key points 30 for each of the target objects 20 detected from the captured images 10. It is noted that various existing techniques may be used as a technique for detecting an object of a predetermined type from an image and a technique for detecting key points of the object detected from the image. For example, a machine learning-based model (hereinafter, called object detection model), which is trained to output key points of each of the target objects 20 included in an image in response to this image being input thereinto, is prepared in advance. The detection unit 2040 can obtain the key points 30 of each of the target objects 20 included in the captured images 10 by inputting the captured images 10 into the object detection model.

In order to correct, using a correction parameter of a target object 20 determined based on the appropriate image, key points 30 of the same target object 20 detected from another captured image 10, the target object 20 needs to be tracked for a plurality of captured images 10. In order to achieve this, the detection unit 2040 determines, for example, for each of the target objects 20 detected from the captured image 10, whether or not the target object 20 same as that has already been detected from another captured image 10, and allocates an identifier to the target object 20 based on the result of the determination. To the target object 20 that is determined to have been already detected from another captured image 10, the identifier that has already been allocated is used. On the other hand, to a target object 20 that is not detected from another capture image 10, a new identifier is allocated. Accordingly, one identifier is allocated to the same target objects 20 as each other that are detected from each of a plurality of captured images 10. It is therefore possible to track one target object 20 for a plurality of captured images 10.

It is noted that various existing techniques may be used as a technique for determining whether or not the target objects 20 detected from captured images 10 that are different from each other are the same as each other. For example, by comparing features of the target objects 20 obtained from the captured images 10 that are different from each other, it can be determined whether or not they are the same as each other. When this method is used, for example, the above-mentioned object detection model that is used for detecting the key points 30 is configured to have a function of outputting features of the detected target objects 20. Accordingly, the detection unit 2040 can obtain the features and the key points 30 of each target object 20 detected from the captured images 10.

<Determination of Whether Appropriacy Condition is Satisfied: S112>

The decision unit 2060 decides whether or not the key points 30 detected for the target object j satisfy the appropriacy condition (S112). The appropriacy condition is a condition that is satisfied when the key points 30 detected for the target object j are suitable for determining a correction parameter. In the following, some specific examples of conditions that may be employed as the appropriacy condition will be described.

Example 1: Condition Regarding Position or Posture of Target Object 20

The appropriacy condition may be, for example, a condition that "the position, the size, or the posture of the target object j, or a combination of two or more of them are included in a predetermined range". Hereinafter, this predetermined range will be referred to as a decision range. When the above appropriacy condition is used, regarding the position, the size, or the posture of the target object j, or a combination of two or more of them, a range suitable for determining the correction parameter is defined in advance as the decision range. Then, it is determined that the appropriacy condition is satisfied when the position, the size, or the posture of the target object j that is determined based on the key points 30 detected from the captured image i, or a combination of two or more of them is included in a range suitable for determining the correction parameter (i.e., decision range). On the other hand, it is determined that the appropriacy condition is not satisfied when the position, the size, or the posture of the target object j determined based on the key points 30 detected from the captured image i, or a combination of two or more of them is not included in the decision range.

If the range of the position of the target object j is included in the decision range, the decision unit 2060 determines the position of the target object j using the key points 30 of the target object j. The position of the target object j may be represented, for example, by the position of a specific point of the target object j (the centroid or the like). Suppose that the position of the target object j is represented by the position of the centroid of the target object j. In this case, the decision unit 2060 computes the position of the centroid of the key points 30 of the target object j detected from the captured image i, and uses the position of the centroid as a parameter that represents the position of the target object j.

Here, suppose that the position of the target object j is represented by coordinates on a k-dimensional space (k is 2 or 3). In this case, the decision range of the position of the target object j can be represented by a partial space in the k-dimensional space. That is, the appropriacy condition that "the position of the target object j is included in the decision range" is satisfied when the coordinates on the k-dimensional space representing the position of the target object j detected from the captured image i are included in the decision range that is a partial space on the k-dimensional space.

When the range of the size of the target object j is included in the decision range, the decision unit 2060 determines the size of the target object j using the key points 30 of the target object j detected from the captured image i. There are various methods for representing the size of the target object j. Suppose that the key points 30 represent vertices of the bottom surface of a three-dimensional bounding box of the target object j projected onto the road. In this case, the decision unit 2060 uses the key point correspondence points 80 on the orthoimage 50 to determines a rectangular area that represents the target object j on the orthoimage 50, and uses (w, h), which is a combination of the width w and the height h of this rectangular area, as a parameter that represents the size of the target object j.

Figure 6:
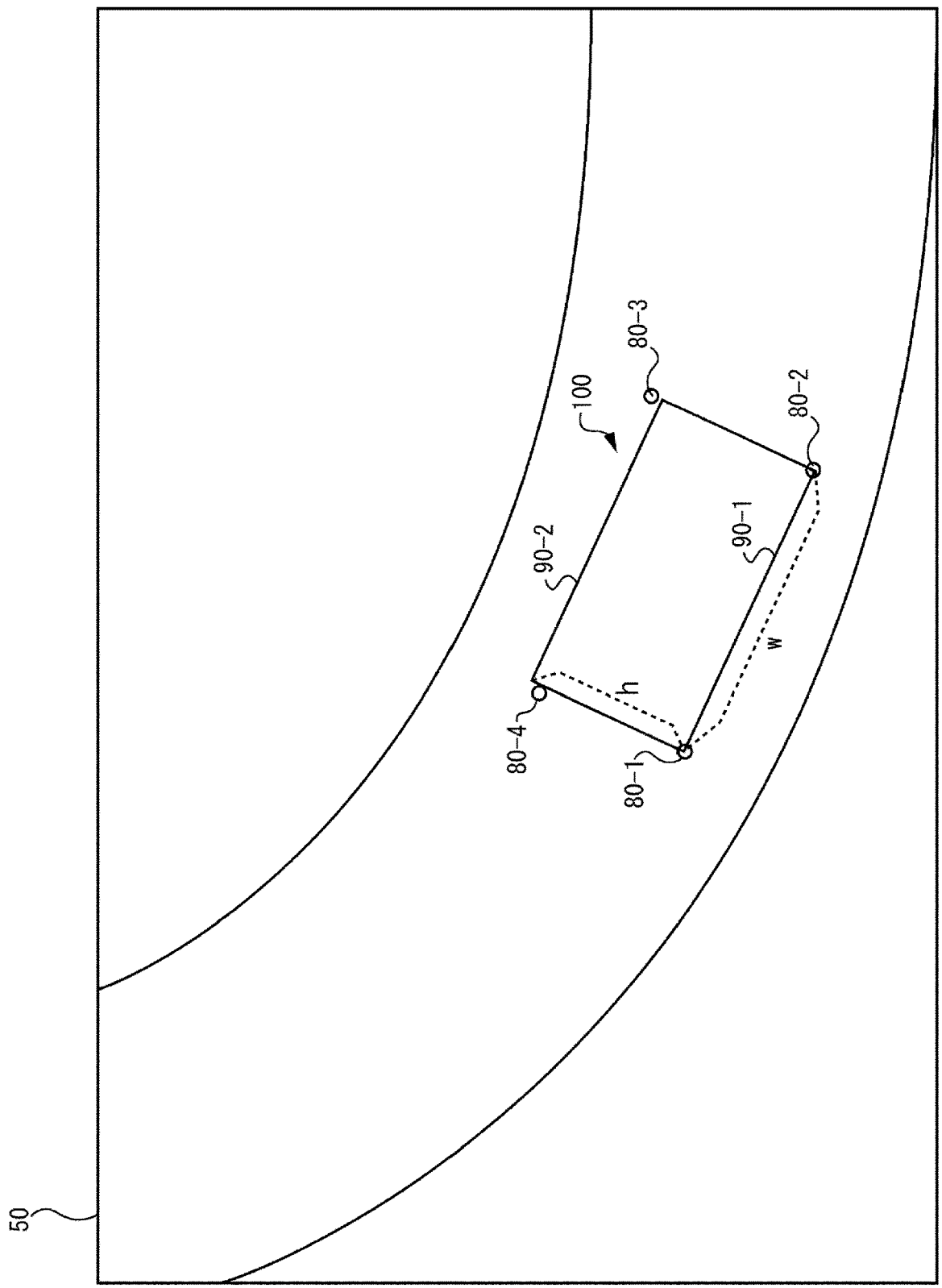
FIG. 6 is a diagram illustrating a method for determining a rectangular area representing the target object.

There are various methods for determining a rectangular area that represents the target object j on the orthoimage 50. Here, with reference to FIG. 6, a specific example thereof will be described. FIG. 6 is a diagram illustrating a method for determining the rectangular area that represents the target object j. In FIG. 6, the key point correspondence points 80 of the target object j are key point correspondence points 80-1 to 80-4.

First, the decision unit 2060 determines one of the key point correspondence points 80 of the target object j that is the closest to the camera 40. Suppose that the key point correspondence point 80 that is the closest to the camera 40 is the key point correspondence point 80-2 in FIG. 6. Next, from two key point correspondence points 80 that are adjacent to the key point correspondence point 80-2 in a rectangle that is formed by the key point correspondence points 80-1 to 80-4, the decision unit 2060 determines the key point correspondence point 80 with which the longer line segment is obtained by connecting it to the key point correspondence point 80-2 (which is farther from the key point correspondence point 80-2). In FIG. 6, the key point correspondence points 80 that are adjacent to the key point correspondence point 80-2 are the key point correspondence points 80-1 and 80-3. The line segment that connects the key point correspondence point 80-1 to the key point correspondence point 80-2 is longer than the line segment that connects the key point correspondence point 80-3 to the key point correspondence point 80-2. Therefore, the key point correspondence point 80 to be determined is the key point correspondence point 80-1.

The decision unit 2060 determines, as a rectangular area 100 that represents the target object j, a rectangular area that has a line segment connecting the key point correspondence point 80-1 determined above and the key point correspondence point 80-2 as a long side 90-1 and whose another long side 90-2 passes near the key point correspondence points 80-3 and 80-4. There are various methods for determining the long side 90-2. For example, the long side 90-2 is determined in such a way that the distance between the long side 90-1 and the long side 90-2 (i.e., the length of the short side of the rectangular area 100) becomes equal to the distance between the long side 90-1 and the key point correspondence point 80-3, the distance between the long side 90-1 and the key point correspondence point 80-4, or the average of these two distances. In the example shown in FIG. 6, the distance between the long side 90-1 and the long side 90-2 is the average of the distance between the long side 90-1 and the key point correspondence point 80-3 and the distance between the long side 90-1 and the key point correspondence point 80-4.

When the size of the target object j is represented by the width and the height as described above, the decision range regarding the size of the target object j is represented by a partial space in a two-dimensional space. That is, when the size of the target object j is represented by (w, h), which is a combination of the width with the height, the decision range regarding the size of the target object j can be represented by a partial space in a wh space. Therefore, the appropriacy condition that "the size of the target object j is included in the decision range" is satisfied when the size (w[i,j]), h[i,j]) of the target object j detected from the captured image i is included in the decision range, which is the partial space in the wh space.

The size of the target object j may be represented in three dimensions. Suppose that eight respective vertices of a three-dimensional bounding box of the target object j is detected as the key points 30. In this case, the size of the target object j can be represented by (w, d, h), which is a combination of the width w, the depth d, and the height h of the three-dimensional bounding box. In this case, the decision range regarding the size of the target object j is represented by a partial space in a three-dimensional space. Therefore, the appropriacy condition that "the size of the target object j is included in the decision range" is satisfied when the size (w[i,j], d[i,j], h[i,j]) of the target object j detected from the captured image i is included in the decision range, which is a partial space in the hdw space.

When the range of the posture of the target object j is included in the appropriacy condition, the decision unit 2060 determines the posture of the target object j using the key points 30 of the target object j detected from the captured image i. There are various methods for representing the posture of the target object j. For example, the posture of the target object j is represented by a posture angle θ of the target object j on the orthoimage 50. The posture angle of the target object j on the orthoimage 50 may be represented, for example, by the angle of a reference axis of the target object j with respect to a reference axis (e.g., horizontal axis) of the orthoimage 50. The reference axis of the target object j may be, for example, the long side or the short side of the rectangular area 100 that represents the target object j described in FIG. 6.

When the posture of the target object j is represented by the posture angle of the target object j as described above, the decision range regarding the posture of the target object j is represented by a partial space in one dimension (i.e., numerical range of the posture angle θ). Therefore, the appropriacy condition that "the posture of the target object j is included in the decision range" is satisfied when the posture angle θ[i,j] of the target object j detected from the captured image i is included in the decision range, which is a predetermined numerical range.

The posture of the target object j may be represented by the posture thereof on a three-dimensional space. In this case, for example, the posture of the target object j may be represented by (pitch θ, roll φ, yaw ψ), which is a combination of angles that the three-dimensional bounding box of the target object j forms with respect to the reference axes of the three respective directions. In this case, the decision range regarding the posture of the target object j is represented by a partial space in the three-dimensional space. Therefore, the appropriacy condition that "the posture of the target object j is included in the decision range" is satisfied when the posture (θ[i,j], φ[i,j], ψ[i,j]) of the target object j detected from the captured image i is included in a decision range, which is a partial space in the θφψ space.

As described above, the decision range may be defined for a combination of two or more of the position, the size, and the posture of the target object j. Suppose that the decision range is defined as a range of (x, y, θ), which is a combination of the position (x, y) and the posture θ of the target object j. In this case, the decision unit 2060 determines whether or not a combination (x[i,j], y[i,j], θ[i,j]) of the position and the posture of the target object j detected from the captured image i is included in the decision range.

In another example, suppose that the decision range is defined as a range of (x, y, w, h, θ), which is a combination of the position (x, y), the size (w, h), and the posture θ of the target object j. In this case, the decision unit 2060 determines whether or not a combination (x[i,j], y[i,j], w[i,j], h[i,j], θ[i,j]) of the position, the size, and the posture of the target object j detected from the captured image i is included in the decision range.

It is noted that when the decision range includes the range regarding the size of the target object j, the decision rage can be determined for each type of the target object j if the position or the posture of the target object j suitable for determining the correction parameter varies for each of the target objects of different sizes, such as a bus, a truck, a passenger car, or a person. On the other hand, if the range of the position or the posture that is suitable for determining the correction parameter does not vary greatly even when the sizes of the target objects j are different from one another, it is possible to reduce the amount of the computation required to decide whether or not the appropriacy condition is satisfied or to reduce the time required to perform this computation, by excluding the size of the target object j from the decision range.

A method for defining the decision range will be described later.

Example 2: Condition Regarding Time Stability of Key Points 30

In another example, the appropriacy condition may be a condition that "time stability of the key points 30 of the target object j is high". The time stability of the key points 30 being high means that a change over time of the key points 30 is small. If this appropriacy condition is used, the decision unit 2060 computes an index value representing time stability (hereinafter, called a time stability index value) for the key points 30 of the target object j detected from the captured image i. In this case, as a more specific appropriacy condition, a condition that "the time stability index value computed for the key points 30 of the target object j is equal to or smaller than a threshold" may be used. Therefore, when the time stability index value is equal to or smaller than the threshold, it is determined that the detection condition is satisfied. On the other hand, when the time stability index value is larger than the threshold, it is determined that the detection condition is not satisfied.

The time stability index value is computed based on, for example, a change over time of the size of the target object j in the captured image i. The time stability index value is computed using, for example, the following Expression (1).

[Expression 1]

$$E_{i,j} = \sum_{T_i - P \leq t \leq T_i} \left\| \frac{\partial (w_j(t), h_j(t))}{\partial t} \right\| \quad (1)$$

E_(i,j) denotes the time stability index value regarding the target object j detected from the captured image i. This time stability index value represents the time stability of the size of the target object j. For notational convenience, subscripts are shown by underscores in parts other than expressions. (w(t)_j, h(t)_j) represents the size of the target object j detected from the captured image 10 at time t. The method for computing the size of the target object 20 has already been described above. The symbol ‖a‖ denotes a norm of a vector a. In Expression (1), the time stability index value can be represented by the total amount of the change over time of the size of the target object j in a period having a length P ended at a time T_i at which the captured image i has been generated.

Further, if the captured images 10 are generated at regular time intervals (if the camera 40 captures images at constant intervals), the time stability index value may be computed by the following Expression (2).

[Expression 2]

$$E_{i,j} = \sum_{N_i-N_p \leq t \leq N_i} \|(w[t,j], h[t,j]) - (w[t-1,j], h[t-1,j])\| \quad (2)$$

N_i denotes a frame number of the captured image i and corresponds to the time T_i of Expression (1). N_p represents the length P of the period used to compute the time stability index value in terms of the number of captured images 10. (w[t,j], h[t,j]) denotes the size of the target object j detected from a captured image 10 whose frame number is t.

Here, the magnitude of the reliability of the key points 30 may be taken into account to compute the time stability index value. In this case, the time stability index value can be represented, for example, by the following Expression (3).

[Expression 3]

$$F_{i,j} = \alpha * \sum_{T_i-P \leq t \leq T_i} \frac{1}{r(t)_j} + \beta * E_{i,j} \quad (3)$$

$$\text{s.t. } \alpha + \beta = 1$$

F_(i,j) represents the time stability of the key points 30 of the target object j detected from the captured image i in which the reliability of the key points 30 is taken into account. r(t)_j denotes the magnitude of the reliability of the key points 30 of the target object j detected from the captured image 10 at a time t. An inverse number of r(t)_j is used so that the time stability index value decreases as the reliability becomes higher. E_(i,j) is time stability of the key points 30 of the target object j detected from the captured image i that is computed not taking the reliability of the key points 30 into account. E_(i,j) is computed using, for example, Expressions (1) or (2). The symbols α and β are weight coefficients assigned to the first term and the second term, respectively.

Various existing methods may be used as the method for computing the reliability of the key points 30. For example, by tracking key points using filtering such as a Kalman filter, it is possible to compute the reliability of the key points from a covariance matrix of state variables.

Example 3: Combination of Example 1 with Example 2

The decision unit 2060 may use the aforementioned Example 1 and Example 2 in combination with each other. In the following, the appropriacy condition described in Example 1 is referred to as an appropriacy condition 1 and the appropriacy condition described in Example 2 is referred to as an appropriacy condition 2. If both the appropriacy condition 1 and the appropriacy condition 2 are satisfied, the decision unit 2060 decides that the appropriacy condition is satisfied. On the other hand, if at least one of the appropriacy condition 1 and the appropriacy condition 2 is not satisfied, the decision unit 2060 decides that the appropriacy condition is not satisfied.

For example, first, the decision unit 2060 computes the position or the like of the target object j detected from the captured image i and determines whether or not the computed position or the like is included in the decision range (i.e., whether or not the appropriacy condition 1 is satisfied). If the appropriacy condition 1 is not satisfied, the decision unit 2060 decides, regarding the target object j detected from the captured image i, the appropriacy condition is not satisfied (S112: NO). On the other hand, if the appropriacy condition 1 is satisfied, the decision unit 2060 decides whether or not the time stability of the target object j detected from the captured image i is high (i.e., whether or not the appropriacy condition 2 is satisfied). If the appropriacy condition 2 is not satisfied, the decision unit 2060 decides, regarding the target object j detected from the captured image i, that the appropriacy condition is not satisfied (S112: NO). On the other hand, if the appropriacy condition 2 is satisfied, the decision unit 2060 decides, regarding the target object j detected from the captured image i, that the appropriacy condition is satisfied (S112: YES).

In another example, if at least one of the appropriacy condition 1 and the appropriacy condition 2 is satisfied, the decision unit 2060 may decides that the appropriacy condition is satisfied. In this case, it is decided that the appropriacy condition is not satisfied only when neither the appropriacy condition 1 nor the appropriacy condition 2 is satisfied.

<Determination of Correction Parameter: S114>

The determination unit 2080 determines the correction parameter regarding the target object j using the key points 30 of the target object j detected from the captured image i that corresponds to the target object j (S114). The correction parameter is a parameter representing, for example, the size of the target object j. For example, when the size of the target object j is represented by the width w and the height h, the determination unit 2080 determines the size (w[i,j], h[i,j]) of the target object j detected from the captured image i as the correction parameter.

Suppose that the size of the target object j is represented by the width w, the depth d, and the height h. In this case, the determination unit 2080 determines the size (w[i,j], d[i,j], h[i,j]) of the target object j detected from the captured image i as the correction parameter.

The determination unit 2080 put the correction parameter that has been decided into a storage unit, which is accessible from the key point correction apparatus 2000, in association with identification information of the corresponding target object j. The determination regarding whether the correction parameter of the target object j has already been decided (S110) can be made by determining, for example, whether or not the correction parameter that corresponds to the target object j is stored in this storage unit.

<<Update of Correction Parameter>>

In the flowchart shown in FIG. 5, whether or not the appropriacy condition is satisfied is not decided for the target object j for which a correction parameter has already been determined. However, even when a correction parameter has already been decided for the target object j detected from the captured image i, it is possible that the key points 30 of the target object j detected from the captured image i satisfy the appropriacy condition and that a correction parameter that is more suitable than the current correction parameter may be obtained from the key points 30. In this case, for example, the key point correction apparatus 2000 may update the correction parameter in a case in which a correction parameter has already been determined.

Figure 7:
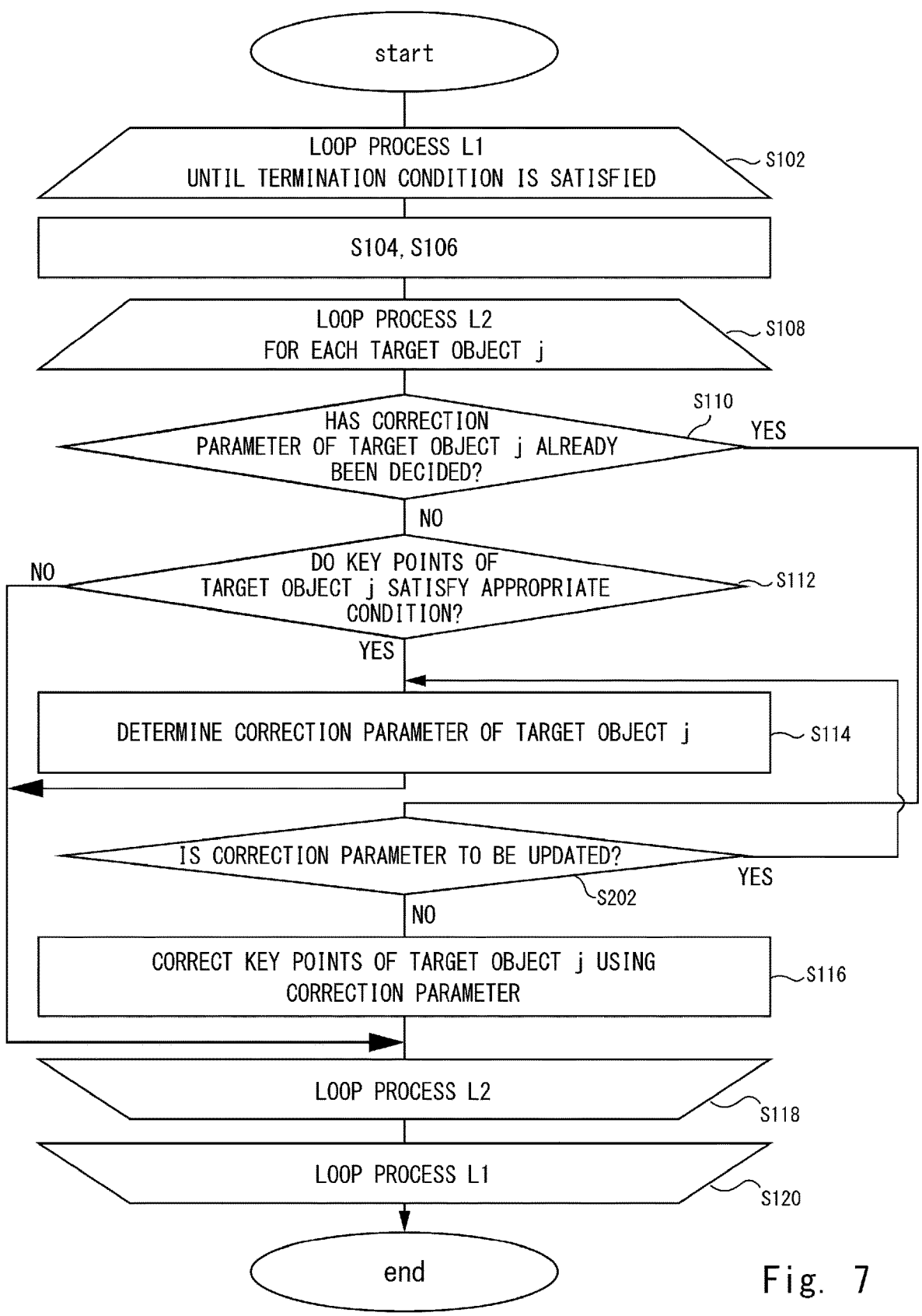
FIG. 7 is a flowchart illustrating a flow of process of the key point correction apparatus having a function of updating a correction parameter.

FIG. 7 is a flowchart illustrating a flow of process of the key point correction apparatus 2000 having a function of updating the correction parameter. In FIG. 7, when the correction parameter of the target object j has already been determined (S110), it is decided whether or not to update the correction parameter (S202). If it is decided that the correction parameter will be updated (S202: YES), a correction parameter is newly determined (S114).

There are various methods for determining whether or not to update the correction parameter in S202. Suppose that a plurality of decision ranges whose priorities are different from one another are defined in a case in which the aforementioned appropriacy condition 1 is used. In this case, if a correction parameter has been determined using the key points 30 of the target object j detected from the captured image i as a result of these key points 30 satisfying the appropriacy condition, the determination unit 2080 sets the priority of the decision range that corresponds to this appropriacy condition as the priority of the correction parameter. The information representing the priority of the correction parameter is stored in the storage unit along with the correction parameter.

In S202, the determination unit 2080 decides, for another captured image i obtained afterwards, whether or not the key points 30 of the target object j detected from the captured image i satisfy the appropriacy condition. If the appropriacy condition is not satisfied, the determination unit 2080 decides that the correction parameter will not be updated. On the other hand, if the appropriacy condition is satisfied, the determination unit 2080 further decides whether or not the priority of the decision range that corresponds to the satisfied appropriacy condition is higher than the priority of the current correction parameter that corresponds to the target object j. When the priority of the decision range that corresponds to the satisfied appropriacy condition is higher than the priority of the current correction parameter that corresponds to the target object j, the correction parameter is updated. On the other hand, when the priority of the decision range that corresponds to the satisfied appropriacy condition is not higher than the priority of the current correction parameter that corresponds to the target object j, the correction parameter is not updated.

Suppose that a decision range R1 of a priority 1, a decision range R2 of a priority 2, and a decision range R3 of a priority 3 are defined. It is assumed here that the priority becomes higher as the numerical value thereof becomes larger. In this case, it is assumed that the appropriacy condition has been satisfied since the position or the like of the target object j detected from the captured image i is included in the decision range R2. It is further assumed that the correction parameter has not yet been determined for the target object j. In this case, the determination unit 2080 determines the correction parameter using the key points 30 of the target object j detected from the captured image. In this case, the priority of the correction parameter is set as 2.

Suppose that the appropriacy condition has been satisfied afterwards since the position or the like of the target object j detected from another captured image i is included in the decision range R1. In this case, the priority of the appropriacy condition satisfied here is 1, which is lower than the priority 2 of the current correction parameter that corresponds to the target object j. Therefore, the correction parameter is not updated.

Suppose that the appropriacy condition has been satisfied afterwards since the position or the like of the target object j detected from another captured image i is included in the decision range R3. In this case, the priority of the appropriacy condition satisfied here is 3, which is higher than the priority 2 of the current correction parameter that corresponds to the target object j. Therefore, the determination unit 2080 determines the correction parameter using the key points 30 of the target object j detected from the captured image i and updates the correction parameter. The priority 3 is associated with the correction parameter.

In a case in which the aforementioned appropriacy condition 2 is used, it is possible to decide whether or not to update the correction parameter based on the size of the time stability index value. Specifically, if a correction parameter has been determined using key points 30 of the target object j detected from the captured image i as a result of the key points 30 satisfying the appropriacy condition 2, the determination unit 2080 sets the computed time stability index value as a value representing the priority of this correction parameter. The smaller the time stability index value is, the more useful. Therefore, the smaller the time stability index value is, the higher the priority is.

After that, when the key points 30 of the target object j detected from another captured image i have satisfied the appropriacy condition 2, the determination unit 2080 decides whether or not the computed time stability index value is smaller than the value set as the priority of the current correction parameter that corresponds to the target object j. When the computed time stability index value is smaller than the value of the priority, the correction parameter is updated. On the other hand, when the computed time stability index value is not smaller than the value of the priority, the correction parameter is not updated.

In a case in which the time stability index value is slightly smaller than the value of the priority, a more appropriate correction parameter should be obtained. However, it is possible that the effects obtained by the update of the correction parameter may not be large. In this case, for example, the correction parameter may be updated only in a case in which the computed time stability index value is smaller than the value of the priority and the difference between them is sufficiently large (equal to or larger than a threshold).

<Correction of Key Points 30: S116>

When the target object j has been detected from the captured image i generated after the captured image 10 that corresponds to the target object j (S110: YES), the correction unit 2100 corrects the key points 30 of the target object j detected from the captured image i using the correction parameter that corresponds to the target object j (S116). The captured image 10 regarding which key points 30 are to be corrected is referred to as an image to be corrected.

Suppose that the size (w, h) of the target object j is determined as the correction parameter that corresponds to the target object j. In this case, the correction unit 2100 computes, for each of the key points 30 of the target object j on the captured image i, the key point correspondence points 80 on the orthoimage 50 by perform orthorectification on the image to be corrected. The correction unit 2100 further generates a correction rectangle, which is a rectangular area of the size (w, h), based on the arrangement of the key point correspondence points 80 on the orthoimage 50 and corrects the key point correspondence points 80 in such a way that the key point correspondence points 80 becomes respective vertices of the correction rectangle. After that, the correction unit 2100 converts the respective key point correspondence points 80 after the correction into points on the image to be corrected by performing inverse conversion for making the orthoimage 50 back to the image to be corrected. The points on the image to be corrected that are obtained as described above are used as the key points 30 after the correction.

Now, a method for correcting the key point correspondence points 80 will be explained. The correction unit 2100 associates, for example, the respective key point correspondence points 80 of the target object 20 with respective vertices of a correction rectangle having the size (w, h). The correction unit 2100 further determines the arrangement of the correction rectangle in such a way that the sum of the distances between corresponding points is minimized. The correction unit 2100 then changes the positions of the respective key point correspondence points 80 to the positions of the vertices of the corresponding correction rectangle. Further, when there is no key point correspondence point 80 that corresponds to the vertex of the correction rectangle, the correction unit 2100 generates new key point correspondence points 80 that correspond to the vertex. In this way, by correcting the position of the key point correspondence points 80 and generating the key point correspondence points 80 using the correction rectangle, the key point correspondence points 80 are corrected.

Figure 8:
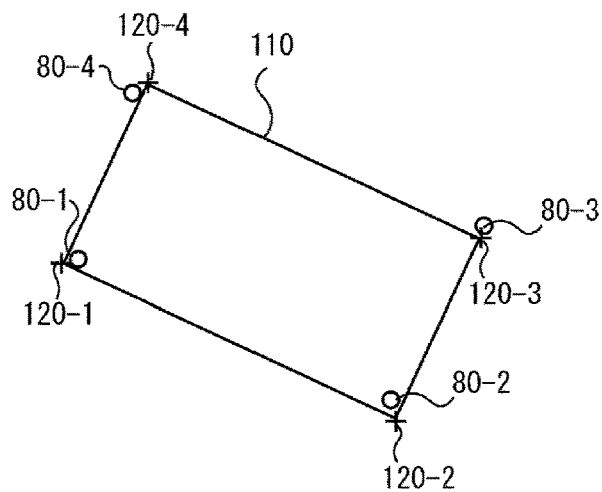
FIG. 8 is a diagram illustrating a method for correcting key point correspondence points using a correction rectangle.
Figure 8:
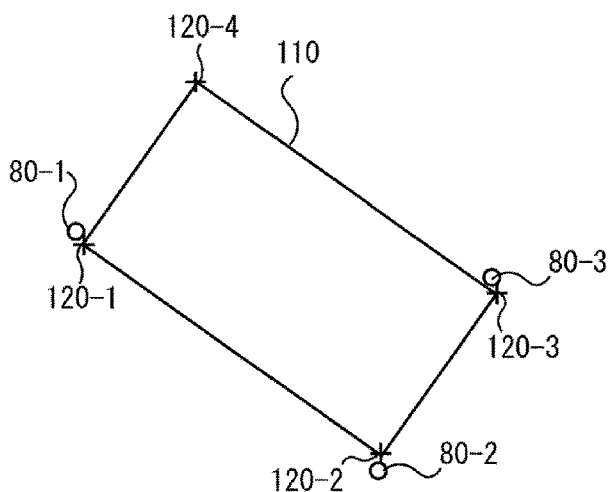
Figure 8:
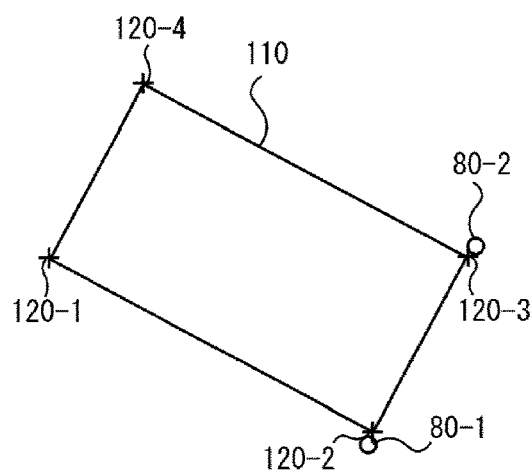

FIG. 8 is a diagram illustrating a method for correcting the key point correspondence points 80 using a correction rectangle. The case shown in the upper part of FIG. 8 is a case in which there are four key point correspondence points 80. In this case, the arrangement of a correction rectangle 110 is determined based on the positions of the key point correspondence points 80-1, 80-2, 80-3, and 80-4. Then, the positions of the key point correspondence points 80-1, 80-2, 80-3, and 80-4 are corrected to the positions of vertices 120-1, 120-2, 120-3, and 120-4, respectively.

The case shown in the middle part of FIG. 8 is a case in which there are three key point correspondence points 80. In this case, the arrangement of the correction rectangle 110 is determined based on the positions of the key point correspondence points 80-1, 80-2, and 80-3. Then, the positions of the key point correspondence points 80-1, 80-2, and 80-3 are respectively corrected to the positions of vertices 120-1, 120-2, and 120-3. Further, a new key point correspondence point 80 is generated in the position of the vertex 120-4.

The case shown in the lower part of FIG. 8 is a case in which there are two key point correspondence points 80. In this case, the arrangement of the correction rectangle 110 is determined based on the positions of the key point correspondence points 80-1 and 80-2. Then, the positions of the key point correspondence points 80-1 and 80-2 are respectively corrected to the positions of vertices 120-2 and 120-3. Further, new key point correspondence points 80 are generated in the position of the vertex 120-1 and the position of the vertex 120-4.

When there are two key point correspondence points 80 of the target object 20, the arrangement of the correction rectangle 110 varies depending on which part of the target object 20 (right front, left front, right back, or left back) each of the key point correspondence points 80 represents. In the case in the lower part of FIG. 8, for example, an arrangement in which the key point correspondence point 80-1 and the key point correspondence point 80-2 are associated with the vertex 120-1 and the vertex 120-4, respectively, may be employed.

In view of the above, for example, the detection unit 2040 is configured to determine which part of the target object 20 is represented by the key point 30 when detecting the key points 30. The correction unit 2100 then acquires information indicating which part of the target object 20 is represented by the key point 30, and associates the vertices 120 of the correction rectangle 110 with the key point correspondence points 80 using the acquired information.

Arbitrary method may be employed as a method for configuring the detection unit 2040 so as to be able to determine which part of the target object 20 is represented by the key point 30. Suppose that key points 30 are detected using the object detection model, as described above. In this case, the object detection model is configured so as to output the key points 30 in a manner where it is possible to know which part of the target object 20 is represented by the key point 30. Suppose, as a more specific example, that the object detection model is implemented by with a neural network. In this case, what each output node of the object detection model means is defined at the time of training of the object detection model. Therefore, the correction unit 2100 is able to determine which part of the target object 20 is represented by a key point correspondence point 80 based on from which output node of the object detection model the key point 30 corresponding to the key point correspondence point 80 of the target object 20 is output.

<Output of Results>

The key point correction apparatus 2000 outputs information indicating the results of the process. Hereinafter, information output by the key point correction apparatus 2000 will be referred to as output information. The output information includes at least information indicating key points 30 regarding each of the target objects 20 detected from each of the captured images 10. The information indicating the key points 30 is, for example, coordinates of the key points 30 in the target object 20.

In a case in which key points 30 are corrected by the correction unit 2100, the output information includes, at least, information indicating the key points 30 after the correction. In this case, information indicating the key points 30 before the correction may or may not be included in the output information.

The output information may include an image generated by superimposing key points 30 of the target object 20 or an image representing a three-dimensional bounding box on the captured image 10. In this image, key points 30 that are not corrected and key points 30 that are corrected may be distinguished from each other. For example, a mark that shows the key points 30 that are corrected and a mark that shows the key points 30 that are not corrected may be of colors different from each other so that they can be distinguished from each other.

<Method for Generating Decision Range>

If the aforementioned appropriacy condition 1 is used, the decision range needs to be generated in advance. In the following, a method for generating the decision range will be explained. An apparatus having a function of generating the decision range is referred to as a decision range generation apparatus. The decision range generation apparatus may either be integrated with the key point correction apparatus 2000 (implemented with one computer) or may be separated from the key point correction apparatus 2000 (implemented with computers different from each other).

Figure 9:
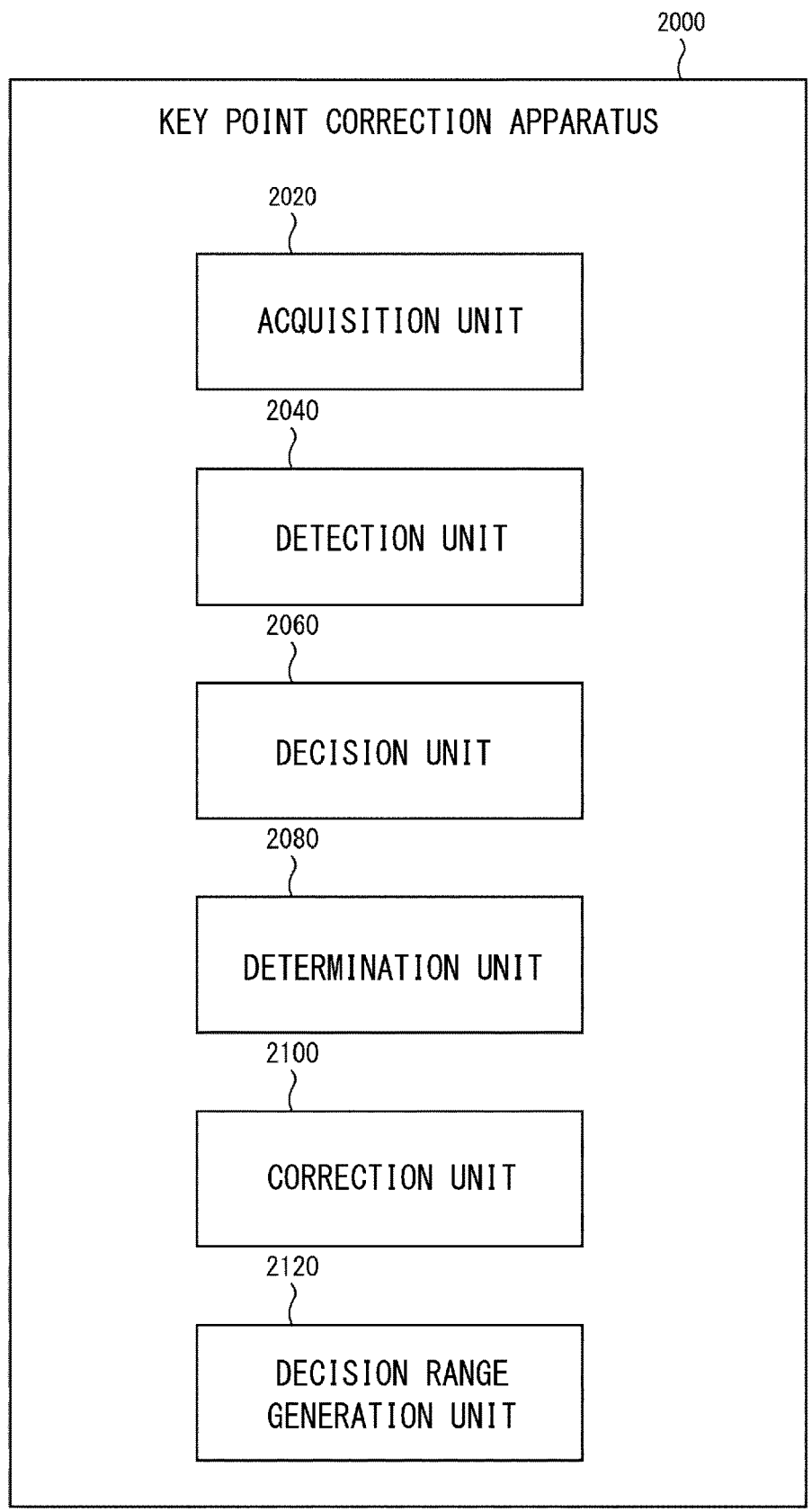
FIG. 9 is a block diagram illustrating a functional configuration of a key point correction apparatus including a decision range generation unit.

When the decision range generation apparatus is integrated with the key point correction apparatus 2000, the key point correction apparatus 2000 includes a decision range generation unit that implements the function of the decision range generation apparatus. FIG. 9 is a block diagram illustrating a functional configuration of the key point correction apparatus 2000 including the decision range generation unit. It is assumed, in the following description, that it is the decision range generation unit 2120 that generates the decision range in order to simplify the explanation. When the decision range generation apparatus is separated from the key point correction apparatus 2000, it is the decision range generation apparatus that performs the process described below.

The decision range may be generated, for example, by clustering with training images. Captured images obtained from the camera 40 may be used as the training images. A ground-truth key point is added to a training image. A ground-truth key point in a training image represents the key point that should be detected from this training image. For example, the ground-truth key point is manually determined by a user or the like of the decision range generation apparatus.

Figure 10:
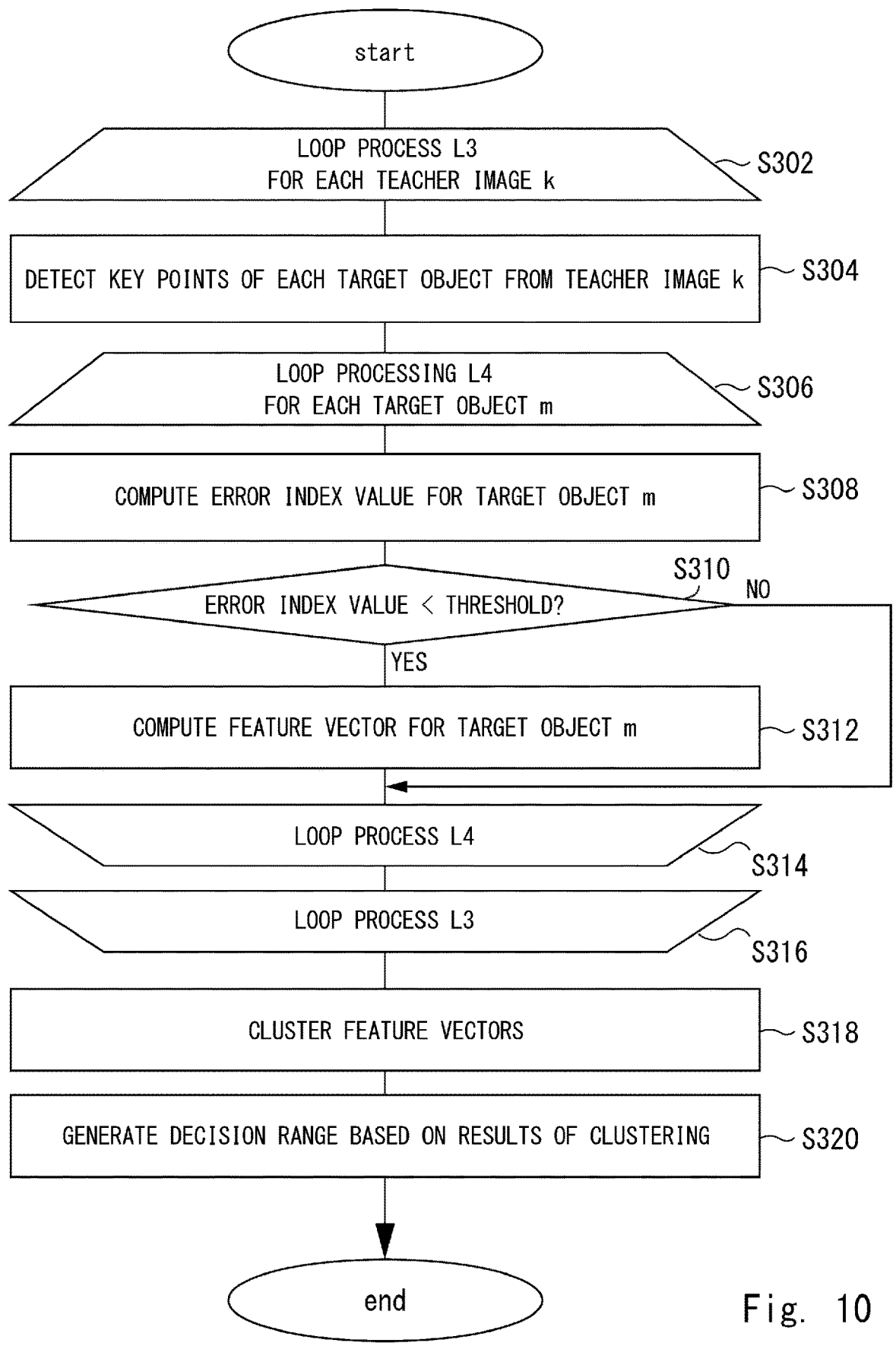
FIG. 10 is a flowchart illustrating a flow of process of generating a decision range using training images.

FIG. 10 is a flowchart illustrating a flow of process of generating a decision range using training images. S302 to S316 form loop process L3. The loop process L3 is executed for each of the training images. In S302, the decision range generation unit 2120 determines whether or not there are training image that have not yet been subjected to the loop process L3. If the loop process L3 has already been executed for all the training images, the process of FIG. 10 proceeds to S318. On the other hand, if there are training images that have not yet been subjected to the loop process L3, one of them is selected and the loop process L3 is executed for the selected training image. The training image selected here is referred to as a training image k.

The decision range generation unit 2120 detects key points 30 of each of one or more target objects 20 from the training image k (S304). The process of detecting the key points 30 of each of the target objects 20 from the training image k is realized by process similar to the process in which the detection unit 2040 detects the key points 30 of each of the target objects 20 from the captured images 10. Therefore, for example, the detection unit 2040 is used for the process of detecting the key points from the training image k.

The process from S306 to S314 form loop process L4. The loop process L4 is executed for each target object 20 that has been detected from the training image k. In S306, the decision range generation unit 2120 determines whether or not there are target objects 20 detected from the training image k that have not yet been subjected to the loop process L4. When the loop process L4 has already been executed for all the target objects 20, the process of FIG. 10 proceeds to S316. On the other hand, if there are target objects 20 that have not yet been subjected to the loop process L4, one of them is selected and the loop process L4 is executed for the selected target object 20. The target object 20 selected here is denoted by a target object m.

The decision range generation unit 2120 computes an error index value representing an error between the key points 30 detected for the target object m and the ground-truth key point for the target object m (S308). The error index value is, for example, a statistical value (e.g., an average value) of the distance between the key points 30 and the ground-truth key point corresponding to each other. Suppose that the ground-truth key points A1, A2, A3, and A4 are set for the target object m of the training image k. Further suppose that B1, B2, B3, and B4 have been detected from the training image k as the key points 30 of the target object m. The decision range generation unit 2120 first associates the ground-truth key points with the key points 30. For example, the decision range generation unit 2120 associates each ground-truth key point of the target object m with the key point 30 of the target object m that is the closest to that ground-truth key point. Suppose that key points B1, B2, B3, and B4 have been associated with the ground-truth key points A1, A2, A3, and A4, respectively. In this case, the decision range generation unit 2120 computes a statistical value of the distance between A1 and B1, the distance between A2 and B2, the distance between A3 and B3, and the distance between A4 and B4 as an error index value.

The decision range generation unit 2120 determines whether or not the error index value computed for the target object m is equal to or smaller than a threshold (S310). If the error index value is equal to or smaller than the threshold (S310: YES), the decision range generation unit 2120 computes a feature vector using the key points 30 of the target object m detected from the training image k.

The feature vector represents features such as the position or the posture of the target object m. Suppose that the position (x, y), the size (w, h), and the posture $\theta$ are used as the features of the target object m. In this case, the feature vector is represented by a five-dimensional vector (x, y, w, h, $\theta$).

After the feature vector is computed or after it is determined that the error index value is larger than the threshold (S310: NO), the process of FIG. 10 proceeds to S314. Since S314 is the end of the loop process L4, the process of FIG. 10 proceeds to the top of the loop process L4 (S306).

After the loop process L4 has ended for the training image k, the process of FIG. 10 proceeds to S316. Since S316 is the end of the loop process L3, the process of FIG. 10 proceeds to the top of the loop process L3 (S302).

After the loop process L3 is performed for each of the training images, the decision range generation unit 2120 clusters the plurality of feature vectors that are computed so far (S318). The error index value being equal to or smaller than the threshold means that the key points 30 of the target object m detected from the training image k is close to the ground-truth key points (in other words, that the key points 30 are detected with high accuracy). Therefore, when the error index value is equal to or smaller than the threshold, the feature vector of the target object m detected from the training image k represents the position, the posture or the like of the target object m for which key-points can be detected accurately. Therefore, the decision range generation unit 2120 uses the feature vector that can be obtained when the error index value becomes equal to or smaller than the threshold, thereby determining a range of the position or the posture of the target object for which key points can be detected accurately, and handles this range as a decision range.

Various existing techniques may be used as a specific method for classifying a plurality of vectors by clustering. The decision range generation unit 2120 classifies the feature vectors into a plurality of clusters by, for example, approximating the distribution of the feature vectors using a mixed Gaussian distribution represented by the following Expression (4).

[Expression 4]

$$\min E = \sum_{u=1}^{U} \sum_{v=1}^{V_u} \|p_v - c_u\|^2 \qquad (4)$$

The symbol u denotes an identifier of the cluster and U denotes the total number of clusters. The symbol v denotes an identifier of a feature vector in the cluster and V_u denotes the total number of feature vectors included in the clusters u. The symbol p_v denotes a feature vector. The symbol c_u denotes the centroid of the cluster u.

Each centroid c_u that minimizes E may be determined using, for example, the Expectation-Maximization (EM) method such as the k-means method. Further, various existing techniques may be used as a method for determining an appropriate total number of clusters in the clustering.

The decision range generation unit 2120 generates a decision range based on the results of the clustering (S320). Specifically, first, the decision range generation unit 2120 computes, for each of the plurality of clusters generated by clustering, the stability index value representing the stability of the cluster. The stability index value can be computed as a value that becomes larger as the degree of scattering of the feature vectors included in the cluster decreases. The stability index value is computed using, for example, the following Expression (5).

[Expression 5]

$$S = \left\| \begin{pmatrix} \sigma_{hh} & \sigma_{hw} \\ \sigma_{hw} & \sigma_{ww} \end{pmatrix} \right\|^{-1} \quad (5)$$

The symbol S denotes a stability index value. The symbol ||A|| denotes a norm of a matrix A. Further, the matrix whose norm is computed in Expression (5) is a covariance matrix of feature vectors in a cluster projected onto the wh space.

The decision range generation unit 2120 generates a decision range from a cluster whose stability index value is equal to or larger than a threshold. If there are a plurality of clusters whose stability index values are equal to or larger than the threshold, a decision range is generated for each of the clusters. In a case in which a plurality of decision ranges are thus generated, the aforementioned priority may be allocated to each of the decision ranges. For example, higher priorities are allocated to clusters with larger stability index values.

Now, a method for generating a decision range from clusters will be explained. For example, the decision range generation unit 2120 computes the centroid of the clusters and sets a region near the centroid as the decision range. The region near the centroid may be, for example, a region obtained by adding a predetermined range to the value of the centroid for each of the elements of the feature vectors. Suppose that a feature vector is represented by a five-dimensional vector (x, y, w, h, θ) that represents the position (x, y), the size (w, h), and the posture θ of the target object 20. Further suppose that the centroid of the clusters is (xc, yc, wc, hc, θc). In this case, for example, the decision range may be "xc−α<x<xc+α, yc−α<y<yc+α, wc−α<w<wc+α, hc−α<h<hc+α, and θc−α<θ<θc+α" in which a predetermined width is added to each element from the centroid. It is noted that although the size of the range around the centroid is a fixed value a for all the elements in this example, the size of the range may vary for each element. For example, the ranges of the respective elements may be determined using the degree of scattering of each element in a cluster (dispersion or standard deviation).

Further, the decision range generation unit 2120 may generate the decision range using only some of the elements that are used to generate the clusters. For example, when a feature vector is represented by a five-dimensional vector that represents the position, the size, and the posture of the target object 20, as described above, the decision range generation unit 2120 may generate a decision range as a range of a three-dimensional space that represents the position and the posture of the target object 20. This corresponds to generating a decision range from a partial space obtained by projecting a cluster in the five-dimensional space onto a three-dimensional space. In a case in which, for example, a predetermined width is added to each element to the centroid as described above, a decision range of "xc−α<x<xc+α, yc−α<y<yc+α, and θc−α<θ<θc+α" may be generated.

While the present application has been described with reference to the example embodiments, the present application is not limited to the aforementioned example embodiments. Various changes that may be understood by one skilled in the art may be made to the configurations and the details of the present application within the scope of the present application.

In the aforementioned examples, the program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A key point correction system comprising:
   at least one memory storing instructions; and
   at least one processor that executes the instructions to:
   acquire a plurality of captured images;
   detect a plurality of key points of a moving object from each of the captured images;
   generate one or more orthoimages by performing orthorectification on the plurality of captured images, the one or more orthoimages include a plurality of key point correspondence points that correspond to the plurality of key points projected onto the one or more orthoimages;
   decide whether or not the plurality of key points of the moving object detected from the plurality of captured images satisfy a predetermined appropriacy condition;
   determine, when the plurality of key points of the moving object satisfy the appropriacy condition, a correction parameter to be used to correct the plurality of key points detected for the moving object using the plurality of key point correspondence points on the one or more orthoimages, a rectangular area on the one or more orthoimages that represents the moving object, and determining one or more dimensions of the rectangular area as the correction parameter, the one or more dimensions including a combination of width and height of the rectangular area; and correct, when the correction parameter has been determined for the moving object regarding which the plurality of key points are detected from the plurality of captured images, the plurality of key points by using the correction parameter, wherein the appropriacy condition indicates a decision range, which is a range that a position, a size, or a posture of the moving object, or a combination of two or more of them is required to satisfy, the position or the posture of the moving object including a plurality of surfaces of the moving object in a three-dimensional manner, and the at least one processor further executes the instructions to:

determine the position, the size, or the posture of the moving object using the plurality of key points of the moving object; and decide that the appropriacy condition is satisfied when the determined position, size, or posture, or a combination of two or more of them is included in the decision range;

compute the plurality of key point correspondence points on the one or more orthoimages that correspond to the plurality of respective key points by performing orthorectification on the plurality of key points of the moving object detected from the plurality of captured images;

compute the position, the size, or the posture of the moving object on the one or more orthoimages that is determined based on the positions of the plurality of the computed key point correspondence points as the position, the size, or the posture of the moving object;

train an object detection model to output the plurality of key points of the moving object included in the plurality of captured images in response to inputting the plurality of captured images into the object detection model;

track the moving object by determining whether the moving object is the same that has already been detected from another captured image from the plurality of captured images; and allocate, in response to a result of the determination that the moving object is the same that has already been detected from the another captured image from the plurality of captured images, a first identifier that is different from a second identifier that is associated with determining that the moving object has already been detected.

2. The key point correction system according to claim 1, wherein the at least one processor is further configured to: generate the decision range indicated by the appropriacy condition using a plurality of training images in which ground-truth key points regarding the moving object are indicated, and the generation of the decision range includes:

compute, for each of the plurality of training images, an error between the ground-truth key points in the training image and the key points of the moving object detected from the training image;

compute a feature vector of the key points of the moving object when the error is equal to or smaller than a threshold; and generate the decision range using feature vectors included in a cluster whose stability is equal to or larger than a threshold among a plurality of clusters obtained by clustering the plurality of the computed feature vectors.

3. The key point correction system according to claim 1, wherein the at least one processor is further configured to:

compute, for the plurality of key points of the moving object, a time stability index value that represents temporal stability; and decide that the appropriacy condition is satisfied when the time stability index value is equal to or larger than a threshold.

4. The key point correction system according to claim 3, wherein the time stability index value becomes larger as an amount of change over time of a size of the moving object within a predetermined time becomes smaller.

5. The key point correction system according to claim 4, wherein the time stability index value becomes smaller as reliability of the plurality of key points of the moving object becomes higher.

6. The key point correction system according to claim 1, the at least one processor is configured to correct, when the correction parameter is determined for the moving object regarding which the plurality of key points are detected from the plurality of captured images, one or more of the key points in such a way that the size of the moving object represented by the plurality of key points becomes equal to the size represented by the correction parameter.

7. A key point correction method executed by a computer, the key point correction method comprising:

acquiring a plurality of captured images;

detecting a plurality of key points of a moving object from each of the captured images;

generating one or more orthoimages by performing orthorectification on the plurality of captured images, the one or more orthoimages include a plurality of key point correspondence points that correspond to the plurality of key points projected onto the one or more orthoimages;

deciding whether or not the plurality of key points of the moving object detected from the captured images satisfy a predetermined appropriacy condition;

determining, when the plurality of key points of the moving object satisfy the appropriacy condition, a correction parameter to be used to correct the plurality of key points detected for the moving object using the plurality of key point correspondence points on the one or more orthoimages, a rectangular area on the one or more orthoimages that represents the moving object, and determining one or more dimensions of the rectangular area as the correction parameter, the one or more dimensions including a combination of width and height of the rectangular area; and correcting, when the correction parameter has been determined for the moving object regarding which the plurality of key points are detected from the captured image, the plurality of key points by using the correction parameter, wherein the appropriacy condition indicates a decision range, which is a range that a position, a size, or a posture of the moving object, or a combination of two or more of them is required to satisfy, the position or the posture of the moving object including a plurality of surfaces of the moving object in a three-dimensional manner, and the key point correction method further comprising:
  determining the position, the size, or the posture of the moving object using the plurality of key points of the moving object;
  deciding that the appropriacy condition is satisfied when the determined position, size, or posture, or a combination of two or more of them is included in the decision range;
  computing the plurality of key point correspondence points on the one or more orthoimages that correspond to the plurality of respective key points by performing orthorectification on the plurality of key points of the moving object detected from the plurality of captured images;
  computing the position, the size, or the posture of the moving object on the one or more orthoimages that is determined based on the positions of the plurality of the computed key point correspondence points as the position, the size, or the posture of the moving object;
  training an object detection model to output the plurality of key points of the moving object included in the plurality of captured images in response to inputting the plurality of captured images into the object detection model;
  tracking the moving object by determining whether the moving object is the same that has already been detected from another captured image from the plurality of captured images; and
  allocating, in response to a result of the determination that the moving object is the same that has already been detected from the another captured image from the plurality of captured images, a first identifier that is different from a second identifier that is associated with determining that the moving object has already been detected.

8. A non-transitory computer readable medium storing a program for causing a computer to execute:
  acquiring a plurality of captured images;
  detecting a plurality of key points of a moving object from each of the captured images;
  generating one or more orthoimages by performing orthorectification on the plurality of captured images, the one or more orthoimages include a plurality of key point correspondence points that correspond to the plurality of key points projected onto the one or more orthoimages;
  deciding whether or not the plurality of key points of the moving object detected from the captured images satisfy a predetermined appropriacy condition;
  determining, when the plurality of key points of the moving object satisfy the appropriacy condition, a correction parameter to be used to correct the plurality of key points detected for the moving object using the plurality of key point correspondence points on the one or more orthoimages, a rectangular area on the one or more orthoimages that represents the moving object, and determining one or more dimensions of the rectangular area as the correction parameter, the one or more dimensions including a combination of width and height of the rectangular area; and
  correcting, when the correction parameter has been determined for the moving object regarding which the plurality of key points are detected from the captured image, the plurality of key points by using the correction parameter,
  wherein the appropriacy condition indicates a decision range, which is a range that a position, a size, or a posture of the moving object, or a combination of two or more of them is required to satisfy, the position or the posture of the moving object including a plurality of surfaces of the moving object in a three-dimensional manner, and
  the computer further caused to execute:
  determining the position, the size, or the posture of the moving object using the plurality of key points of the moving object;
  deciding that the appropriacy condition is satisfied when the determined position, size, or posture, or a combination of two or more of them is included in the decision range;
  computing the plurality of key point correspondence points on the one or more orthoimages that correspond to the plurality of respective key points by performing orthorectification on the plurality of key points of the moving object detected from the plurality of captured images;
  computing the position, the size, or the posture of the moving object on the one or more orthoimages that is determined based on the positions of the plurality of the computed key point correspondence points as the position, the size, or the posture of the moving object;
  training an object detection model to output the plurality of key points of the moving object included in the plurality of captured images in response to inputting the plurality of captured images into the object detection model;
  tracking the moving object by determining whether the moving object is the same that has already been detected from another captured image from the plurality of captured images; and
  allocating, in response to a result of the determination that the moving object is the same that has already been detected from the another captured image from the plurality of captured images, a first identifier that is different from a second identifier that is associated with determining that the moving object has already been detected.

* * * * *